United States Patent
Raimarckers et al.

(10) Patent No.: US 8,676,436 B2
(45) Date of Patent: Mar. 18, 2014

(54) METHOD FOR MONITORING THE OIL SYSTEM OF A TURBOMACHINE

(75) Inventors: Nicolas Raimarckers, Tourinne (BE); Albert Cornet, Verviers (BE); Jacques Charlier, Thimister-Clermont (BE); Marc Strengnart, Fize le Marsal (BE)

(73) Assignee: Techspace Aero S.A., Milmort (BE)

( * ) Notice: Subject to any disclaimer, the term of this patent is extended or adjusted under 35 U.S.C. 154(b) by 51 days.

(21) Appl. No.: 13/295,538

(22) Filed: Nov. 14, 2011

(65) Prior Publication Data

US 2012/0130617 A1   May 24, 2012

(30) Foreign Application Priority Data

Nov. 24, 2010 (EP) .................................. 10192394

(51) Int. Cl.
*G01M 15/09* (2006.01)
(52) U.S. Cl.
USPC ....... 701/29.5; 701/32.8; 701/32.9; 701/34.4; 701/99; 703/2; 706/21; 706/47; 73/53.07; 73/118.02; 73/114.55
(58) Field of Classification Search
USPC ........... 701/29.1, 29.4, 29.5, 31.4, 32.8, 32.9, 701/34.4, 99; 703/2; 60/39.08; 706/21, 46, 706/47; 73/53.05, 53.07, 118.01, 118.02, 73/114.55
See application file for complete search history.

(56) References Cited

U.S. PATENT DOCUMENTS

| | | | | |
|---|---|---|---|---|
| 4,219,805 A * | 8/1980 | Magee et al. | ................. | 340/631 |
| 4,506,337 A * | 3/1985 | Yasuhara | ...................... | 701/29.5 |
| 5,852,793 A * | 12/1998 | Board et al. | .................... | 702/56 |
| 5,968,371 A * | 10/1999 | Verdegan et al. | ............. | 210/739 |
| 6,711,952 B2 * | 3/2004 | Leamy et al. | .................... | 73/579 |
| 6,741,938 B2 * | 5/2004 | Berndorfer | ..................... | 702/23 |
| 7,370,514 B2 * | 5/2008 | Halalay et al. | ............... | 73/53.05 |
| 7,433,770 B2 * | 10/2008 | Inagawa et al. | ................. | 701/51 |
| 7,581,434 B1 * | 9/2009 | Discenzo et al. | ............ | 73/53.01 |
| 7,769,507 B2 * | 8/2010 | Volponi et al. | ............... | 701/31.6 |
| 7,886,875 B2 * | 2/2011 | Shevchencko et al. | ...... | 184/6.11 |
| 8,050,814 B2 * | 11/2011 | Rains et al. | .................. | 701/29.5 |
| 8,109,138 B2 * | 2/2012 | Han et al. | ................... | 73/114.55 |
| 8,301,328 B2 * | 10/2012 | McAndrew et al. | ......... | 701/29.1 |
| 2007/0100518 A1 * | 5/2007 | Cooper | .......................... | 701/29 |
| 2009/0164056 A1 | 6/2009 | Cornet et al. | | |
| 2009/0326784 A1 * | 12/2009 | Tanner et al. | ................. | 701/100 |
| 2010/0307230 A1 * | 12/2010 | Gilch et al. | ................ | 73/114.55 |
| 2012/0046920 A1 * | 2/2012 | Blossfeld et al. | ................. | 703/2 |
| 2012/0166249 A1 * | 6/2012 | Jackson | ....................... | 705/7.28 |

FOREIGN PATENT DOCUMENTS

| | | |
|---|---|---|
| EP | 2 025 881 A2 | 2/2009 |
| EP | 2 072 762 A1 | 6/2009 |
| EP | 2 246 529 A2 | 11/2010 |

* cited by examiner

*Primary Examiner* — Russell Frejd
(74) *Attorney, Agent, or Firm* — Reinhart Boerner Van Deuren P.C.

(57) ABSTRACT

A monitoring method that includes calculating the autonomy of a lubrication system of an airplane engine and also providing for the diagnosis and prognosis of a plurality of problems and breakdowns of the engine and of its lubrication system by means of measurements taken by sensors arranged in the lubrication system. The method further comprises the step of calculating the status of the lubrication system at a given moment and calculating its evolution over time in order to determine the remaining lifetime before a breakdown.

13 Claims, 1 Drawing Sheet

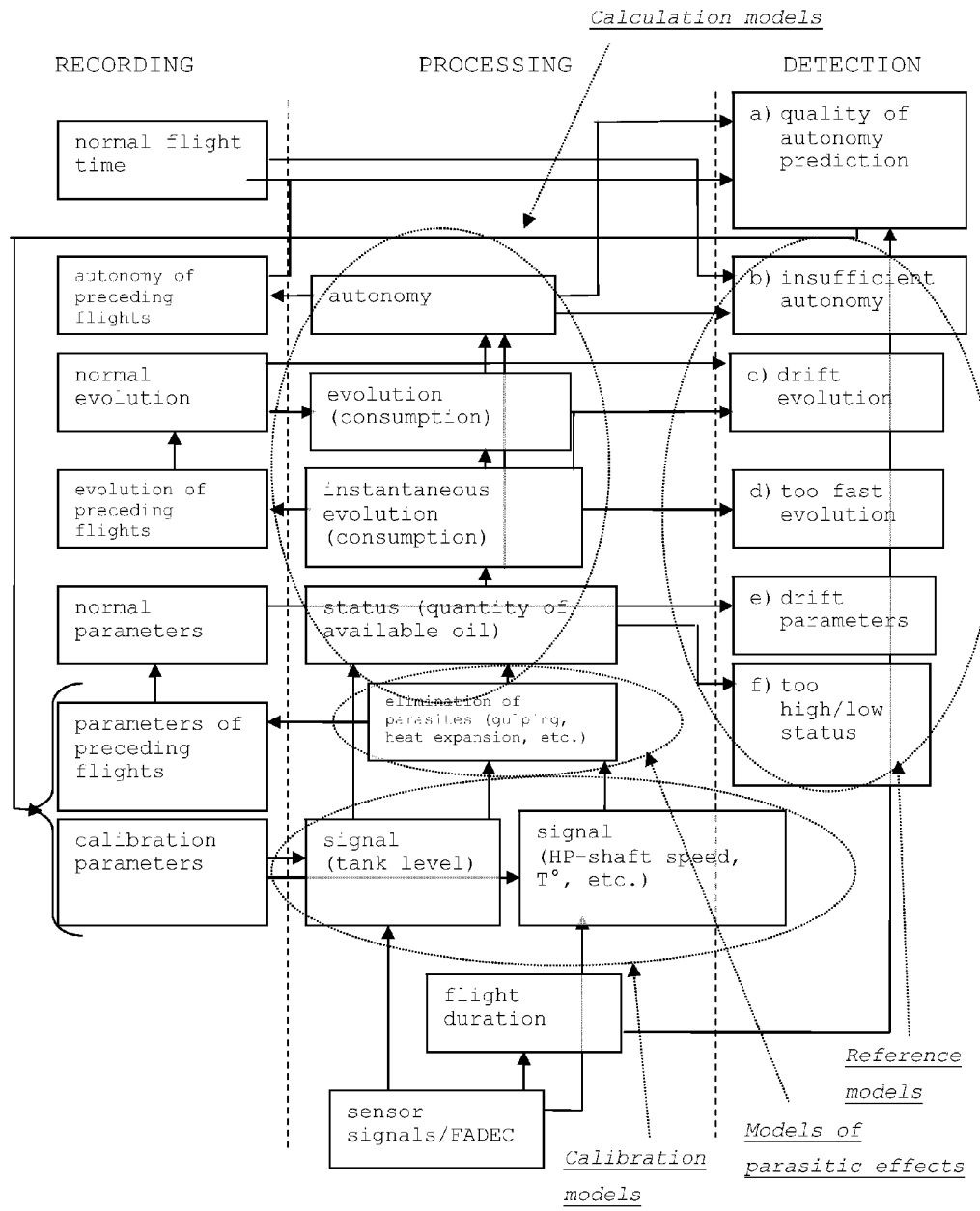

METHOD FOR MONITORING THE OIL SYSTEM OF A TURBOMACHINE

FIELD OF THE INVENTION

The present invention relates to the general field of turbomachine lubrication. It more particularly relates to an overall monitoring method for the oil system of a turbomachine.

STATE OF THE ART

An aeronautic turbomachine comprises many elements that must be lubricated and cooled using an oil system; it in particular involves ball bearings used to support the rotating shafts, as well as gears of the accessory drive case.

On a modern turbojet engine, the lubrication system is provided with several sensors such as sensors for the tank level, oil pressure, oil temperature and differential pressure at the terminals of the filter. To date, the sensors present in the oil system are generally used to detect a breakdown when it is imminent or proven. This therefore entails substantial costs related to the scheduled maintenance and to the consequences of undetected breakdowns.

The processing of the signal provided by the sensors existing in the engine would allow to identify the behavior of the oil system and to detect any breakdown without waiting for maintenance. The predictions for remaining autonomy would also allow to implement predictive rather than scheduled maintenance of the turbomachine.

Detecting a problem is currently based on a simple low or high threshold. A signal of significant drift compared to the references for healthy behavior would allow to detect the problem and prevent the breakdown.

Approaches of overall health-monitoring systems for airplanes or engines are being studied, but do not focus on the oil systems. As a result, they are not very sensitive to that system, either by lack of input (no use of the signals of the oil system) or by over-abundance of information (data provided by the oil system submerged in the data mass of the airplane).

In the state of the art, document WO 2008/152346 A1 proposes a health-monitoring method for a turbomachine and, more particularly, for the performance of a compressor. The method consists in obtaining data (e.g. the pressure and temperature of the core of the turbojet engine) from sensors arranged on at least two engines of the turbomachine in steady rating, in calculating a percentage difference between this data and reference values for each of the engines, in comparing the difference between the percentage differences obtained for each of the engines and, if that difference exceeds a predetermined value, in indicating that there is a problem on one of the engines. This method is not based on the oil system and requires a reference model.

Also known from patent application EP 2 072 762 A1 is a predictive maintenance method where, based on the processing of the signal from the oil-level sensor in the tank, the oil consumption and autonomy are calculated. This method thus allows to detect an abnormal oil consumption, and hence an oil leak or a fuel leak in the oil.

In addition to the transition from a reaction philosophy to a proactive use of the signal from the oil-level sensor in the tank as proposed in patent application EP 2 072 762 A1, the proactive use of several signals from the existing sensors (sensors for the oil level, oil pressure, oil temperature, pressure at the terminals of the filter) and of signals coming from additional sensors would allow to complete the health monitoring of the oil system and to detect breakdowns of the oil system more completely and more reliably.

AIMS OF THE INVENTION

The present invention aims to provide an overall health-monitoring method allowing the diagnosis and prognosis of different breakdowns of the engine and o the lubrication/cooling system by the lubrication/cooling system.

The present invention aims to replace scheduled maintenance with predictive maintenance and thereby to avoid pointless maintenance operations.

The present invention further aims to reduce in-flight incidents (ATO: Aborted Take-Off; IFSD: In-Flight Shut-Down; D&C: Delay & Cancellation).

SUMMARY OF THE INVENTION

The present invention relates to an overall monitoring method allowing to calculate the autonomy of a lubrication system of an airplane engine and further allowing the diagnosis and prognosis of a plurality of problems and breakdowns of the engine and of its lubrication system by means of measurements taken by sensors arranged in said lubrication system, the method comprising the step of calculating the status of the lubrication system at a given moment and calculating its evolution over time in order to determine the remaining lifetime before a breakdown.

According to specific embodiments of the invention, the method comprises at least one or a suitable combination of the following features:

- it does away with the parasitic effects influencing the measurements by comparing the signals of two engines of the airplane, possibly with a reference value, said engines being under substantially identical conditions, and/or by comparing two phases of a same flight or of different flights for which the parasitic effects are identical and/or by modeling the parasitic effects, said modeling being empirical and/or physical;
- the sensors measure an oil level and/or an oil temperature and/or an oil pressure and/or a differential pressure at the terminals of a filter and/or the presence of debris in the oil and/or the quality of the oil;
- it is used for the in-flight management of the airplane and/or for managing the maintenance of the airplane and it can diagnose and forecast an oil leak, aging, breaking and/or overheating of bearings contained in an enclosure of the lubrication system, coking of the oil in tubing, dirtying/clogging in an oil-supply circuit, a fuel leak in the oil and/or deterioration of the oil quality;
- by increasing order of precision for the calculation of the status, evolution and autonomy of the system, the measurements are taken as follows:
  - the measurements are taken at the beginning and end of the flight and the status, evolution and autonomy are calculated based on those measurements;
  - or the measurements are taken at the beginning and end of each flight phase and the status, evolution and autonomy are calculated based on those measurements for each flight phase;
  - or the measurements are taken several times per flight phase and the status, evolution and autonomy are calculated based on those measurements for each flight phase;
  - or the measurements are taken several times per flight phase as well as during the transitions separating the flight phases and the status, evolution and autonomy are calculated based on those measurements for each flight phase and during the transitions;

it compares parameters of the models for status calculation and/or parameters of the models for evolution calculation with parameters of reference models in order to detect abnormal behavior;

the reference models are a gulping model and/or a debris-generation model and/or a model for oil-tank level depending on the content and/or a performance model for a pump and/or a model for pressure difference at the terminals of a filter and/or heat-generation model in the enclosure;

several data recordings related to the flight in progress and to the preceding flights are done to initialize the parameters of the models, to initialize calibration parameters of the sensors, to compare the parameters of the models for calculating the status and the evolution and/or the calibration parameters with those of the reference models and thus to identify a drift, to update the parameters of the models based on the models for recent flights in order to take into account the aging of the engine and to continuously improve the various parameters owing to feedback;

an alarm is triggered when the status has reached a critical level and/or when the evolution is abnormal and/or when a drift of the parameters of the models for status calculation and/or of the parameters of the models for evolution calculation is observed and/or when the autonomy is insufficient;

it returns the status of the lubrication system to a higher monitoring system of an engine or of the airplane;

one or more pieces of data coming from the measurements and/or reference models and/or models for parasitic effects are merged to validate the detection of a problem or of a breakdown:

data on the engine rating and coming from the performance model of a pump are merged with the measurements of oil temperature and pressure to validate the detection of clogged elements of the supply circuit such as the filter, injectors and exchangers;

and/or data on the engine rating and coming from the performance model of a pump and from the model for pressure difference at the terminals of the filter are merged with the measurements of oil temperature and pressure difference at the terminals of the filter to validate the detection of clogged filter;

and/or data on the engine rating and coming from the performance model of a pump are merged with the measurements of oil temperature and pressure as well as with the measurements of pressure difference at the terminals of the filter to distinguish the clogging of the filter from the clogging of another element of the supply circuit;

and/or data on the engine rating and resulting from the heat-generation model in the enclosure are merged with the oil-temperature measurements to validate the detection of abnormal heat generation;

and/or data on the engine rating and coming from the heat-generation model in the enclosure are merged with the measurements of oil temperature, debris and oil-quality sensor to validate the detection of a problem in the bearings;

and/or the data on the rotation speed of a high-pressure shaft of the engine and coming from models of parasitic effects are merged with the measurements of oil temperature and oil-level sensor to validate the detection of an oil leak;

and/or the data on the rotation speed of a high-pressure shaft of the engine and coming from models of parasitic effects are merged with the measurements of oil temperature, oil-level sensor and oil-quality sensor to validate the detection of a fuel leak in the oil;

the data coming from measurements taken in the lubrication system is merged with data coming from measurements taken outside the lubrication system of the airplane engine in order to validate the calculation of the status, evolution and/or autonomy and in order to validate the detection of a problem or breakdown.

The present invention also relates to a lubrication system for an airplane engine comprising sensors for the oil level, oil pressure, oil temperature, differential pressure at the terminals of a filter and further comprising a debris sensor and/or an oil-quality sensor.

The present invention also relates to the airplane engine comprising a lubrication system as described above.

BRIEF DESCRIPTION OF THE DRAWING

FIG. 1 shows an example of monitoring applied to the detection of an oil leak as in the invention.

DESCRIPTION OF THE INVENTION

The present invention relates to an overall health-monitoring method for the lubrication system allowing the diagnosis and prognosis of different breakdowns of the engine and/or of the lubrication/cooling system. Components/breakdowns to be monitored comprise:
  oil consumption and leaks or fuel leaks in the oil;
  aging, breaking and overheating of the components in the enclosures (rolling bearings, gears, seals, etc.);
  coking in the tubing, dirtying of equipment (exchangers, filters) or of injectors;
  deterioration of the quality of oil.

To that end, the method as in the invention uses the signals provided by existing sensors, such as the oil tank level, oil pressure, oil temperature, pressure at the terminals of the filter, and may also use the signals coming from additional sensors that are, for example, a debris sensor and/or an oil-quality sensor. The debris sensor thus allows to detect any wear of a rolling bearing while the oil-quality sensor allows to detect aging, overheating or pollution of the oil. The method as in the invention may also use the signals from the engine (ambient pressure, rotation speed of the shafts).

The present invention uses calculation models to evaluate the status of the system and determine its evolution and autonomy and to detect abnormal behavior, as will be explained below.

According to the invention, the merging of data coming from several sensors with possibly data coming from reference models further allows to guarantee the quality of diagnosis. For example, merging the data coming from the debris sensor and the data on the temperature at the outlet of the enclosure comprising the bearings allows to identify the wear of the latter.

DETAILED DESCRIPTION OF THE INVENTION

According to the invention, predicting various breakdowns is possible by implementing algorithms for calculating the remaining lifetime before breakdown (for example, empty tank) based on the status of the system (for example, the quantity of oil available) and its evolution (for example, consumption and quantity of oil available). "Status" refers to the state of the system or of one of its components at a given moment determined on the basis of measurements taken at that given moment. On that basis (and based on other elements), the evolution of the system over time is then determined.

The only signals given by the sensors do not allow to directly provide the status of the system because they are also influenced by parasitic mechanisms and effects. So, the level of the oil tank depends not only on the quantity of oil available but also, inter alia, on the gulping, i.e. the oil retention in the enclosures. The algorithm implemented to evaluate the status and remaining lifetime must therefore overcome or get around this issue.

A first strategy consists in working by comparing two engines of a same airplane. In that case, the parasitic effects are not eliminated, but can be considered identical on both engines. By difference between the values of the two engines and/or with a third value (theoretical or evaluated during burn-in of the engine), an abnormal consumption or, more generally, an abnormal behavior in the lubrication system is detected.

A second strategy consists in working by comparing two flight phases for which the parasitic phenomena are identical (e.g. in two stabilized cruising phases of the same flight or of two different flights, numerous external parameters are identical. The parasite, i.e. the gulping, of the oil tank is therefore identical).

A third strategy consists in modeling the parasitic mechanisms and effects to evaluate the status of the system from signals coming from the sensors. This modeling may be empirical (based on statistical or learning methods) or physical (based on the engine's internal phenomena) or a combination of the two.

According to the present invention, these different types of strategies may be combined.

The parasitic mechanisms that must be taken into account to estimate the different problems/breakdowns are listed below:
  to estimate the wear of bearings based on detected debris:
    the debris entering through the air system.
  to estimate the heat generation in the enclosure based on the temperature:
    the rotation speed of the high-pressure shafts;
    ambient temperature.
  to estimate the dirtying of the oil-supply circuit based on the supply pressure:
    the viscosity of the fluid (and therefore the temperature). In this respect, a temperature sensor is available;
    the flow rate of the fluid. This requires knowing the rotation speed of the high-pressure shaft and using a model of the pump;
    the pressure difference between the input and the output of the filter.
  to estimate the dirtying of the filter based on the pressure difference between the input and the output of the filter:
    the viscosity of the fluid (and therefore the temperature). In this respect, a temperature sensor is available (as before);
    the flow rate of the fluid. This requires knowing the rotation speed of the high-pressure shaft and using a model of the pump (as before);
    a model for calculating the pressure difference at the terminals of the filter depending on the dirtying for different particle sizes.
  to estimate the quantity of remaining oil based on the level of the tank:
    the heat expansion in the oil tank. The heat-expansion law of the oil and the shape of the tank being known with good precision, the temperature in or near the tank suffices to deduce the contribution of that phenomenon in the oil level measured in the tank;
    the attitude and acceleration. Depending on the shape of the tank and on the position of the level sensor, the influence of the acceleration and of the incline of the airplane may be taken into account. It will be noted that in civil aviation, where the incline does not exceed 20°, these influences could be neglected inasmuch as the sensor is situated close to the center of the tank;
    the gulping (oil retention in the enclosures). This effect is the major cause of variation of the oil level in the tank. It depends on the rotation speed of the shafts and on the temperature of the oil, which in turn depends on the rotation speed (among other influences such as the outside temperature, the other thermal loads specific to the rating, etc.). The dynamics related to the thermal inertia of the engine make the identification of that contribution problematic during the transitional periods; by taking an interest in stabilized ratings where the rotation speed is constant, one does away with part of the complexity.
  Effect of aging. This is not a parasitic effect strictly speaking, but an evolution of the oil consumption of the engine due to its age. It is important to be able to distinguish a gradual, normal increase from a sudden increase due to a breakdown. The evolution of the average consumption with age can be pre-recorded (owing to feedback on other engines) or obtained evolutionarily through successive comparisons between the flights of the engine being monitored. A simpler solution consists in determining a fixed consumption threshold not to be exceeded, but the leak detection is then less sensitive.

According to the degree of knowledge of these mechanisms and to the precision of the signal measurement, determining the system's status and its evolution will be more or less sensitive, and the integration time required for that sensitivity will be longer or shorter. More particularly, the prediction level of the contribution of the parasitic mechanisms will determine different levels of algorithm architectures—to which different possibilities for exploiting the results correspond (see table 1).

In stage 0, the parasitic effects are not estimated and the measurements are taken at the beginning and end of flight and the status is then compared to that of the preceding flight.

In stage 1, the parasitic effects are estimated as a function of the measurements taken when the engine is stopped; the precision of the status and of the evolution is then refined.

In stage 2, the average parasitic effects are known for each engine rating and the evolution can thus be calculated for each flight phase.

In stage 3, several measurements are taken per phase and lastly, in stage 4, the measurements are continuously taken (including transitions).

TABLE 1

| Knowledge of the parasites and measurements of the signal | Detection on the ground | Detection in flight |
|---|---|---|
| Stage 0:<br>No estimation of the parasites<br>Measurements of the signal at the beginning and end of flight | Parasites remaining after flight considered lost<br>The status is compared to that of the preceding flight<br>A limited drift is detectable<br>The autonomy and evolution are calculated in "standard flights," in flight hours or in cycles | Ø |
| Stage 1:<br>Parasites estimated according to measurements taken when the engine is stopped<br>Measurements of the signal at the beginning and end of flight | Idem stage 0, but the remaining parasites are evaluated and the results are less conservative<br>The precision of the status, evolution and autonomy is refined | Ø |
| Stage 2:<br>Average parasites as a function of the measured parameters are known for each engine rating, at a constant rotation speed ($\neq 0$)<br>Measurements of the signal at the beginning and end of each phase | The evolution and autonomy are calculated per phase<br>More reduced detectable drifts with shorter period of time (per phase)<br>Calculation of the evolution and autonomy specific to the upcoming flights (depending on their phases) | Ø |
| Stage 3:<br>Same knowledge of the parasite as in stage 2<br>Several measurements of the signal per phase | The detection remains similar to the previous case and more precise | Detectable drift during a phase<br>In case of drift, indication of a new autonomy estimated in flight hours or cycles<br>The system must be deactivated during the transitions |
| Stage 4:<br>Parasites known according to the measured parameters<br>Several signal measurements per phase and during the transitions | Idem stage 3 | The evolution is evaluated during the transitions<br>The drift detection is possible during transition<br>The autonomy calculation is more precise |

FIG. 1 shows, as a non-limiting example, the monitoring method as in the invention for detecting an oil leak. The different models participating in the method are indicated in italics and underlined.

Several data recordings are done to allow the initialization of the model parameters (models for calculation, parasitic effect, calibration and reference), the comparison of the parameters of the models allowing to calculate the status or evolution with those of reference models (e.g. gulping model, debris-generation model, oil tank level model depending on the content, performance model of the pump, pressure-difference model at the terminals of filter, heat-generation model in the enclosure) and thus the identification of a drift, the update of the parameters of the models based on recent flights in order to take into account the aging of the engine and lastly the continuous improvement of the different parameters (calibration of the sensors and models) owing to the return of information between the predicted autonomy, the number of hours elapsed and the actual autonomy.

Different detections may give rise to alarms:
Simple and robust (see detection f)), the status has reached a critical level. It already involves improvement compared to the state of the art, since the status is actually defined by two or even a single alarm level. The levels here may be multiple.
A second improvement (detection d)) is to be able to define an alarm not on the status but on the evolution, and therefore to react preventively.
Another, more sophisticated improvement (detections c) and e)) allowing anticipation, is to base the detection on a drift of the parameters of the models allowing to calculate the status or evolution. They in fact allow to react not only on the value of the status and evolution, but also on the drift of the latter.
Lastly, a detection of the autonomy (detection b)), sufficient or not, is possible and allows not only a safe flight, but also maintenance management.

Still according to the invention, merging the data coming from several sensors possibly with data coming from the reference models and/or models of parasitic effects allows to guarantee the quality of the diagnosis. Thus, merging the following data allows one to validate the detection of specific problems:
engine rating+performance model of the pump (prevents the use of an expensive and unreliable flow meter)+oil temperature+oil pressure enables the detection of clogged elements of the supply circuit (filter, injectors, exchangers, etc.).
engine rating+performance model of the pump+model of the pressure difference at the terminals of the filter+oil temperature+pressure difference at the terminals of the filter enables the detection of clogged filter.
engine rating+performance model of the pump+temperature+pressure+pressure difference at the terminals of the filter enables the determination of a distinction between clogging of the filter and clogging of another element.
engine rating+heat-generation model in the enclosure+oil temperature enables the detection of abnormal heat generation (churning, etc.).

engine rating+heat-generation model in the enclosure+oil temperature+bearing debris+oil-quality sensor enables the validation of a problem in the bearings.

rotation speed of the high-pressure shaft+models of parasitic effects+oil temperature+oil-level sensor enables the detection of an oil leak.

rotation speed of the high-pressure shaft+models of parasitic effects+oil temperature+oil-level sensor+oil-quality sensor enables the detection of a fuel leak in the oil.

According to the present invention, the data taken at the level of the oil system may also be merged with complementary data taken outside the oil system, for example at the level of the engine, in order to validate the information on status, evolution, autonomy or defect of a component or system through two independent information chains. For example, the information given by the oil system on the engine rolling bearings through the debris measurement and/or the temperature at the outlet from the enclosures may be merged with the information supplied by the vibration-measuring system in order to validate their relevance.

ADVANTAGES OF THE INVENTION

The health monitoring of the oil system enables flight management and maintenance management owing to the flight measurements and ground measurements, respectively.

The health monitoring of the oil system allows to perform a relevant diagnosis of that part of the engine because it has all of the useful information. It also allows to perform a streamlined data merger in order to guarantee the validity of the prognosis done.

The health monitoring of the oil system also allows to return a simple status to the higher health-monitoring system (engine or airplane) on the different monitored components/breakdowns.

The invention claimed is:

1. A monitoring method comprising: calculating the autonomy of a lubrication system of an airplane engine and further allowing the diagnosis and prognosis of a plurality of problems and breakdowns of the engine and of its lubrication system by means of measurements taken by sensors arranged in said lubrication system, the method further comprising the step of calculating a status of the lubrication system at a given moment and calculating its evolution over time in order to determine the remaining lifetime before a breakdown, wherein data coming in from the sensors are merged with data coming from reference models to validate a detection of a problem or breakdown, and wherein the reference models are a gulping model, a debris-generation model, a model for oil-tank level based on the content, a performance model for a pump, a pressure-difference model at the terminals of a filter, and a heat-generation model in the enclosure.

2. The method as in claim 1, further comprising doing away with the parasitic effects influencing the measurements by comparing the signals of two engines of the airplane, possibly with a reference value, said engines being under substantially identical conditions, and/or by comparing two phases of a same flight or of different flights for which the parasitic effects are identical.

3. The method as in claim 1, wherein said sensors respectively measure an oil level, an oil temperature, an oil pressure, a differential pressure at the terminals of a filter, the presence of debris in the oil, and the quality of the oil.

4. The method as in claim 1, being used for the in-flight management of the airplane and for managing the maintenance of the airplane and being able to diagnose and forecast an oil leak, aging, breaking and overheating of bearings contained in an enclosure of the lubrication system, coking of the oil in tubing, dirtying/clogging in an oil-supply circuit, fuel leak in the oil and deterioration of the quality of the oil.

5. The method as in claim 1, wherein, by increasing the order of precision of the calculation of the status, evolution and autonomy of the system, the measurements are taken as follows:

the measurements are taken at the beginning and end of the flight and the status, evolution and autonomy are calculated based on those measurements;

or the measurements are taken at the beginning and end of each flight phase and the status, evolution and autonomy are calculated based on those measurements for each flight phase;

or the measurements are taken several times per flight phase and the status, evolution and autonomy are calculated based on those measurements for each flight phase;

or the measurements are taken several times per flight phase as well as during the transitions separating the flight phases and the status, evolution and autonomy are calculated based on those measurements for each flight phase and during the transitions.

6. The method as in claim 1, comparing parameters of the models for status calculation and/or parameters of the models for evolution calculation with parameters of reference models in order to detect abnormal behavior.

7. The method as in claim 6, wherein several data recordings related to the flight in progress and to the preceding flights are done to initialize the parameters of the models, to initialize calibration parameters of the sensors, to compare the parameters of the models for calculating the status and the evolution and/or the calibration parameters with those of the reference models and thus to identify a drift, to update the parameters of the models based on the models for recent flights in order to take into account the aging of the engine and to continuously improve the various parameters owing to feedback.

8. The method as in claim 6, wherein an alarm is triggered when the status has reached a critical level and/or when the evolution is abnormal and/or when a drift of the parameters of the models for status calculation and/or the parameters of the models for evolution calculation is observed and/or when the autonomy is insufficient.

9. The method as in claim 1, returning the status of the lubrication system to a higher monitoring system of an engine or of the airplane.

10. The method as in claim 1, wherein data coming from the sensors and reference models are also merged with data from models for parasitic effects to validate a detection of a problem or a breakdown.

11. The method as in claim 10, wherein:

data on the engine rating and coming from the performance model of a pump are merged with the measurements of oil temperature and pressure to validate the detection of clogged elements of the supply circuit such as the filter, injectors and exchangers;

and/or data on the engine rating and coming from the performance model of a pump and from the model of pressure difference at the terminals of the filter are merged with the measurements of oil temperature and pressure difference at the terminals of the filter to validate the detection of clogged filter;

and/or data on the engine rating and coming from the performance model of a pump are merged with the measurements of oil temperature and pressure as well as with the measurements of pressure difference at the terminals of the filter to distinguish the clogging of the filter from the clogging of another element of the supply circuit;

and/or data on the engine rating and coming from the heat-generation model in the enclosure are merged with the measurements of oil temperature to validate the detection of abnormal heat generation;

and/or data on the engine rating and coming from the heat-generation model in the enclosure are merged with the measurements of oil temperature, debris and oil-quality sensor to validate the detection of a problem in the bearings;

and/or the data on the rotation speed of a high-pressure shaft of the engine and coming from models of parasitic effects are merged with the measurements of oil temperature and oil-level sensor to validate the detection of an oil leak;

and/or the data on the rotation speed of a high-pressure shaft of the engine and coming from the models of parasitic effects are merged with the measurements of oil temperature, oil-level sensor and oil-quality sensor to validate the detection of a fuel leak in the oil.

12. A monitoring method comprising:

calculating the autonomy of a lubrication system of an airplane engine and further allowing the diagnosis and prognosis of a plurality of problems and breakdowns of the engine and of its lubrication system by means of measurements taken by sensors arranged in said lubrication system, the method further comprising the step of calculating a status of the lubrication system at a given moment and calculating its evolution over time in order to determine the remaining lifetime before a breakdown, wherein data coming in from the sensors are merged with data coming from reference models to validate a detection of breakdown; and comparing parameters of the models for status calculation and/or parameters of the models for evolution calculation with parameters of reference models in order to detect abnormal behavior;

wherein the reference models are a gulping model, a debris-generation model, a model for oil-tank level based on the content, a performance model for a pump, a pressure-difference model at the terminals of a filter, and a heat-generation model in the enclosure.

13. The method as in claim 12, wherein the data coming from measurements taken in the lubrication system are merged with data coming from measurements taken outside the lubrication system of the engine of the airplane in order to validate the calculation of the status, evolution and/or autonomy and in order to validate the detection of a problem or breakdown.

* * * * *

UNITED STATES PATENT AND TRADEMARK OFFICE
CERTIFICATE OF CORRECTION

| | | |
|---|---|---|
| PATENT NO. | : 8,676,436 B2 | |
| APPLICATION NO. | : 13/295538 | |
| DATED | : March 18, 2014 | |
| INVENTOR(S) | : Nicolas Raimarckers et al. | |

It is certified that error appears in the above-identified patent and that said Letters Patent is hereby corrected as shown below:

In the Claims

In Column 12, Line 9, insert the words --a problem or-- between the words "of" and "breakdown".

Signed and Sealed this
Sixteenth Day of September, 2014

Michelle K. Lee
*Deputy Director of the United States Patent and Trademark Office*